March 28, 1967 R. M. BUCHWALD 3,310,995

HAND BRAKE MECHANISM

Filed Dec. 29, 1964 3 Sheets-Sheet 1

INVENTOR.
Robert M. Buchwald
BY
Donald P. Schnabi
HIS ATTORNEY

March 28, 1967  R. M. BUCHWALD  3,310,995
HAND BRAKE MECHANISM
Filed Dec. 29, 1964  3 Sheets-Sheet 2

INVENTOR.
Robert M. Buchwald
BY
Donald P. Scherler
HIS ATTORNEY

March 28, 1967 R. M. BUCHWALD 3,310,995
HAND BRAKE MECHANISM
Filed Dec. 29, 1964 3 Sheets-Sheet 3

INVENTOR.
Robert M. Buchwald
BY
Donald P. Schreck
HIS ATTORNEY

United States Patent Office 3,310,995
Patented Mar. 28, 1967

3,310,995
HAND BRAKE MECHANISM
Robert M. Buchwald, Berkley, Mich., assignor to General Motors Corporation, Detroit, Mich., a corporation of Delaware
Filed Dec. 29, 1964, Ser. No. 421,889
7 Claims. (Cl. 74—535)

This invention relates to vehicle hand brakes and more particularly to a conventional hand brake that is convertible to a fly-off type hand brake by reversing one part of the mechanism.

It is advantageous in the construction of vehicle hand brakes to minimize the number of parts needed for an operative structure as well as minimizing fastening means between operative components. Conventional hand brakes are generally unsuited for use in competition driving and so a fly-off type hand brake evolved. A fly-off type hand brake is a designation given to a hand brake which is releasable by merely removing a holding pressure from an actuating lever. It is important in the construction of modern day vehicles to have available as optional equipment competition oriented mechanisms but, having available in the same model vehicle, the same mechanism usable in a conventional manner.

It is an object of the present invention to provide an improved hand brake that functions as a conventional hand brake when assembled in one manner and is readily convertible to a competition fly-off hand brake when assembled in another manner.

It is another object of the present invention to provide an improved hand brake mechanism that is capable of assembling without the use of ordinary fastening means.

It is still another object of the present invention to provide an improved hand brake mechanism that has a minimum number of parts and a hand brake in which the necessary parts can be formed by an economical stamping process.

Further objects and advantages of the present invention will be apparent from the following description, reference being had to the accompanying drawings wherein preferred embodiments of the present invention are clearly shown.

Figure 1:
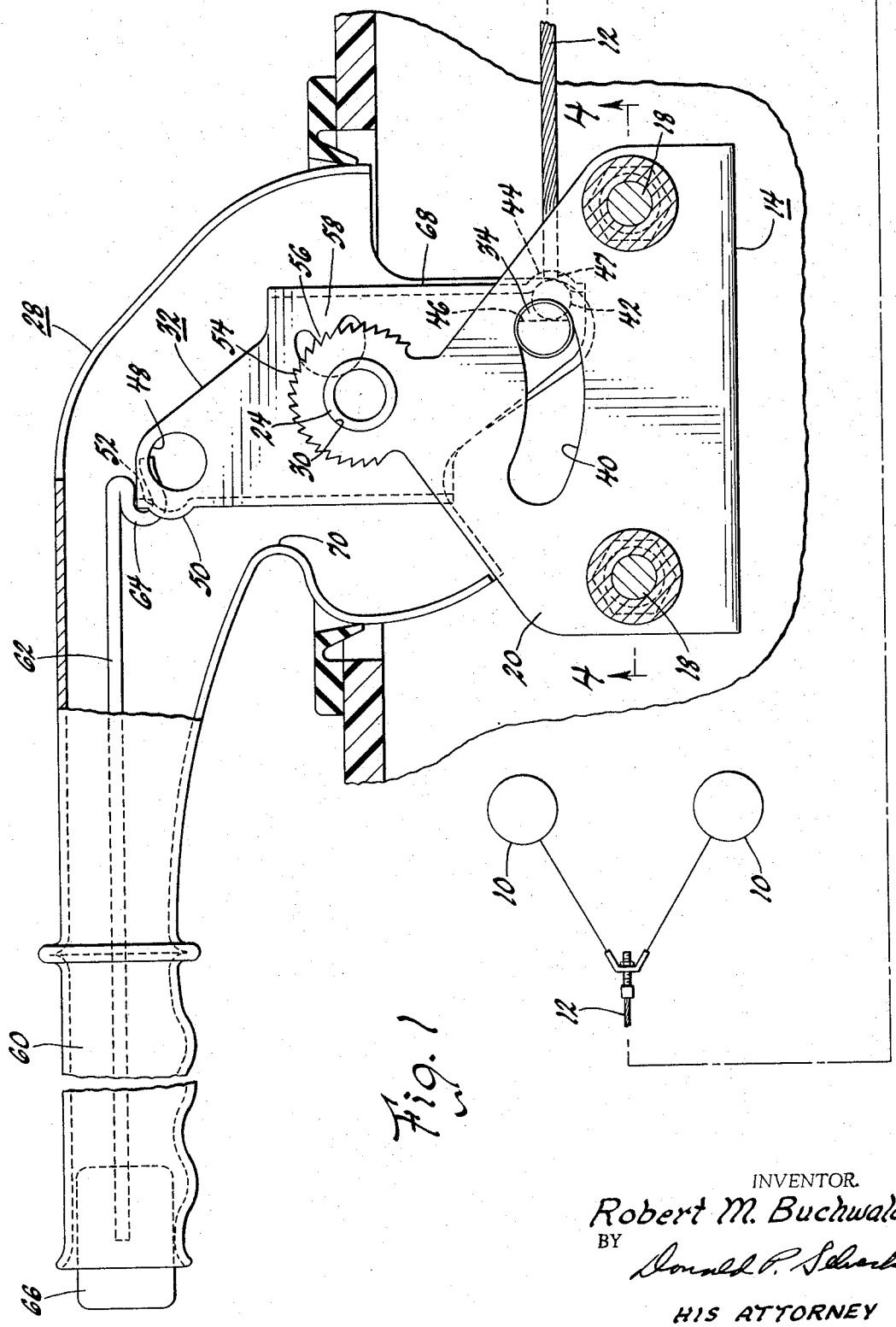
Figure 2:
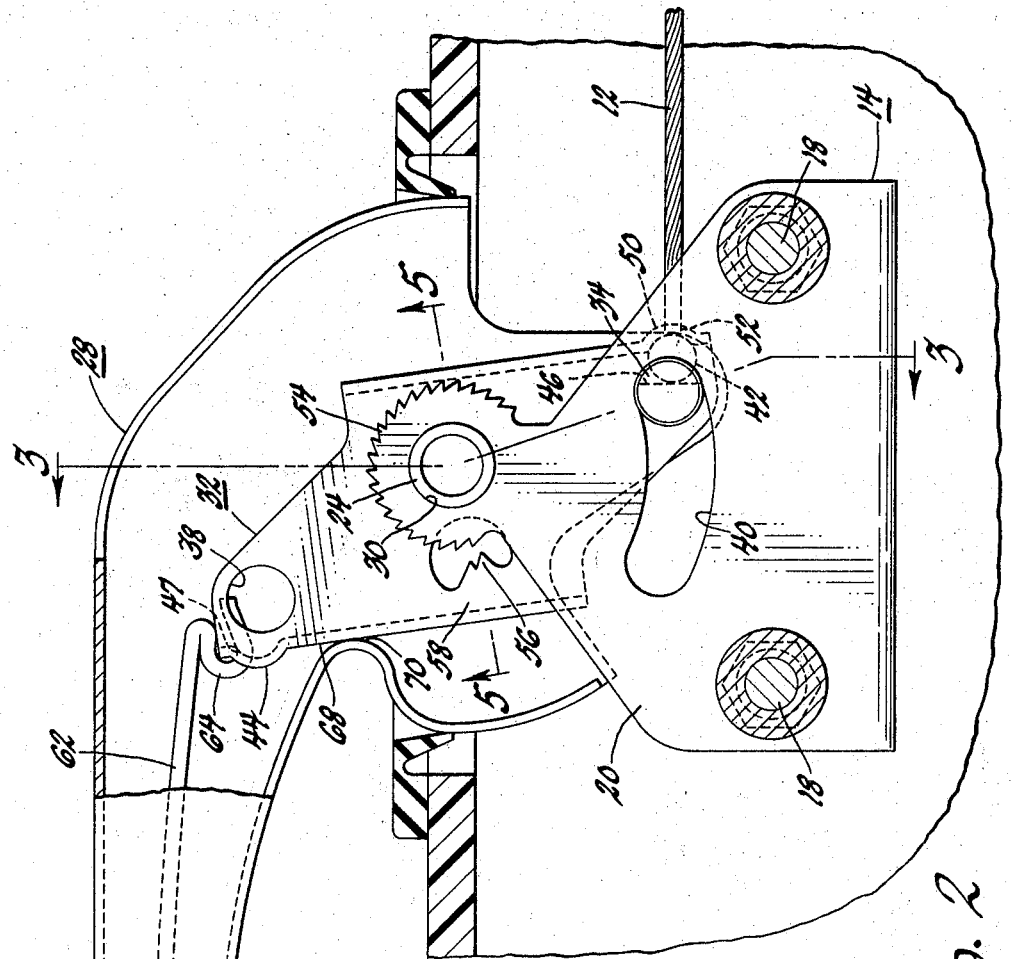
Figure 5:
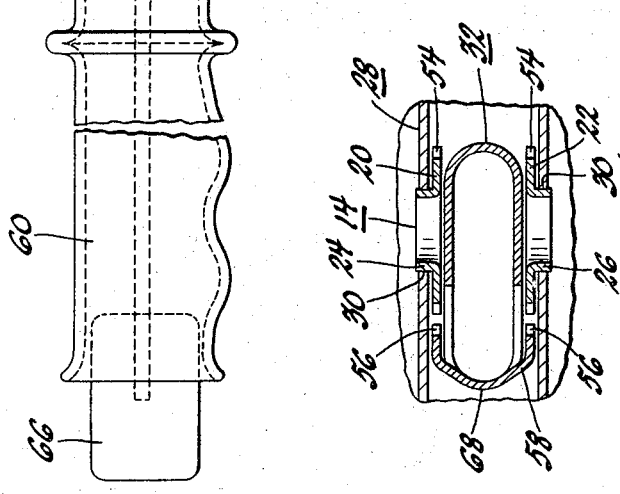
Figure 3:
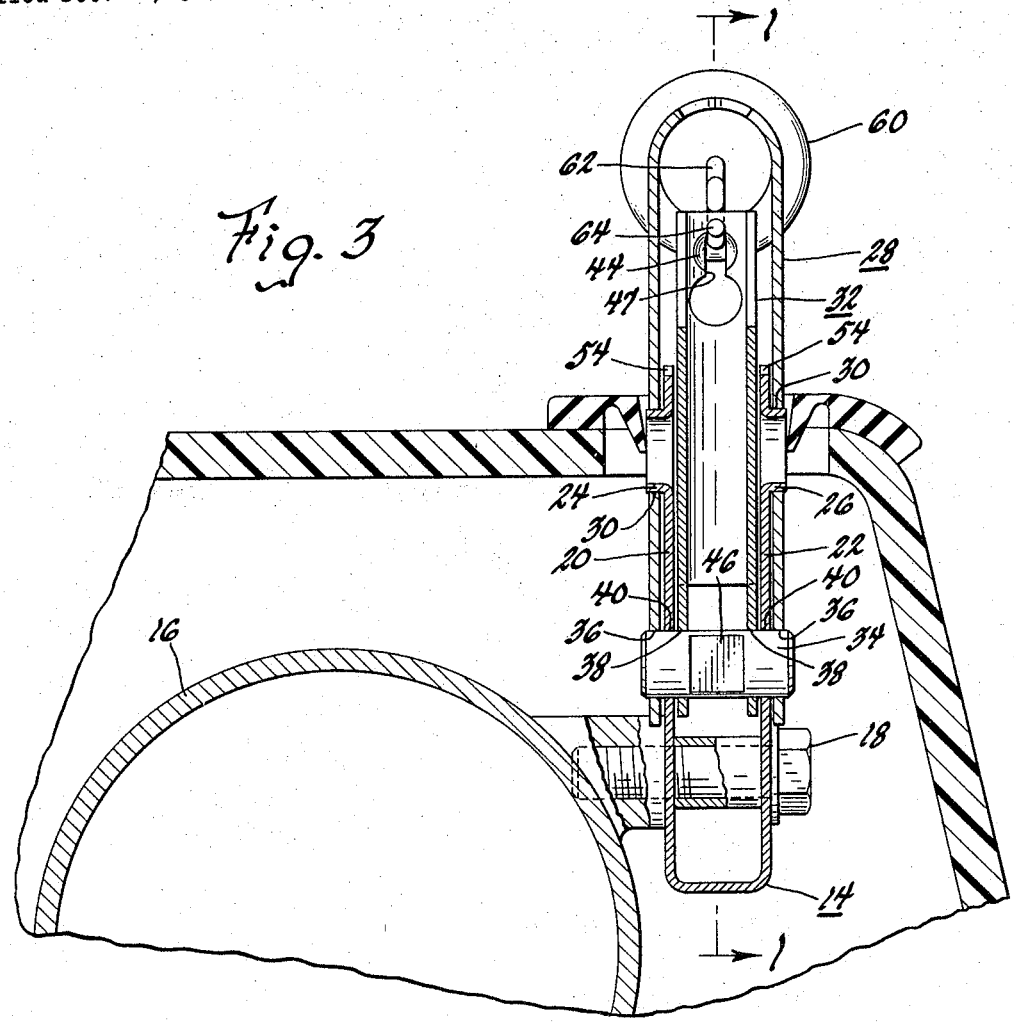
Figure 4:
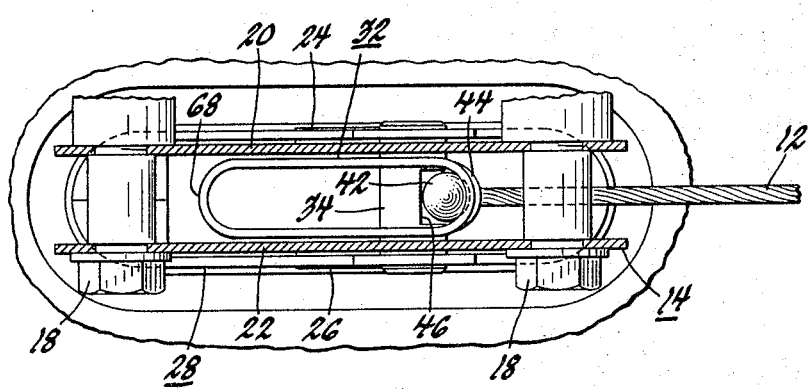

In the drawings:
FIGURE 1 is a sectional view of the subject device taken along line 1—1 of FIGURE 3;
FIGURE 2 is another modification of the subject device taken along line 1—1 of FIGURE 3;
FIGURE 3 is a sectional view of the subject device taken along line 3—3 of FIGURE 2, the mechanism shown in an operative environment;
FIGURE 4 is a sectional view of the subject invention taken along line 4—4 of FIGURE 1;
FIGURE 5 is a sectional view taken along line 5—5 of FIGURE 2.

Referring now to FIGURE 1, a pair of vehicle brakes 10 are diagrammatically illustrated as being energizable through a cable 12 that is adapted for connection to a parking brake mechanism to be hereinafter described.

Referring to FIGURE 3 a parking brake lever bracket 14 is fastened to a fixed portion of a vehicle, for example, a torque tube cover 16 by means of bolts 18. The parking brake lever bracket 14 is illustrated in section and is seen to include two opposed wall portions 20 and 22 having integrally formed therewith oppositely disposed outwardly projecting flanges 24 and 26. The walls 20 and 22 can be formed by a stamping process from any well-known metal that has a certain inherent resiliency when formed with a wall thickness to spacing between the walls ratio, such as illustrated in FIGURE 3.

Referring now to FIGURE 1, an actuator lever 28 includes a pair of oppositely disposed apertures 30 adapted to cooperate with the outwardly projecting flanges 24 and 26 of the lever bracket 14. Referring to FIGURE 3, it is seen that the walls 20 and 22 of the lever bracket 14 are depressed sufficiently to fit between opposed walls of the actuator lever 28 until the projecting flanges 24 and 26 of the lever bracket 14 meet with the apertures 30 formed in the actuator lever 28. Then, due to the normal resiliency of the metal forming the lever bracket 14, the flanges 24 and 26 spring outwardly into the apertures 30, thereby providing a pivotal mounting for the lever 28 on the outer periphery of the flanges 24 and 26. No other fastening means is required between these two parts.

Referring now to FIGURE 1, a ratchet lever 32 is pivotally supported by a pin 34 carried between opposed wall portions of the actuator lever 28. Referring to FIGURE 3, it is seen that the ratchet lever 32 is likewise formed of opposed wall portions smaller in spacing than the spacing between the walls 20 and 22 of the lever bracket 14. The pin 34 is seen disposed in oppositely disposed apertures 36 in the actuator lever 28, with said pin 34 being freely slidable through apertures 36 in the lever 28 and apertures 38 in the ratchet lever 32.

Referring to FIGURE 1, the pin 34 is freely slidable in a slot 40 formed in the wall portions 20 and 22 of the bracket 14. The pin 34 is operatively located in the apertures 36 and 38 by a ball 42 forming an end of the cable 12. The ball 42 is retained in a pocket 44 formed at the juncture of the opposed walls of the ratchet lever 32. The pin 34 has formed therein a slotted pocket 46 adapted to cooperate with an opposite side of the ball 42 from that disposed in the pocket 44 to prevent accidental displacement thereof. An access hole 47 is provided at the base of the pocket 44 to allow entry of the cable 12.

The relationship of the ball 42 and the slotted pocket 46 in the pin 34 is also clearly illustrated in FIGURE 4. It is seen therein that, when the ball is disposed in the pocket 44 and in the slotted pocket 46, it is not readily disengageable therefrom. The brake return springs normally associated with vehicle brakes maintain a pressure at all times on the cable 12 and, hence, the ball 42 to positively retain the ball 42 in the pocket 44. The slotted pocket 46 in the pin 34 is flat and is a segmented portion of the pin 34, therefore, non-rotatable with respect to the ball 42 when mounted.

Therefore, the actuator lever 28, the lever bracket 14 and the ratchet lever 32 are operatively disposed relative to one another without the use of fasteners with operative parts of the structure inventively arranged to hold the components in engagement. It should be noted that apertures 48 are formed on an opposite end of the ratchet lever 32 in the same manner as the apertures 38 as well as a pocket 50 similar to the pocket 44 formed in the opposite end of the lever and an aperture 52 similar to the aperture 47. This duplication of parts enables the reverse positioning of the ratchet lever 32 in a manner converting the subject invention from a conventional hand brake to a fly-off type hand brake.

Ratchet teeth 54 are formed on an arcuate portion of the lever bracket 14 in a peripheral manner with respect to the flanges 24 and 26. Teeth or pawls 56 are formed on the ratchet lever 32 integral to a wall connecting member 58 of the ratchet lever 32. These parts and their spatial relationship is also illustrated in the sectional view of FIGURE 5.

Referring to FIGURE 1, the actuator 28, previously described as being comprised of opposed wall portions has a handle end 60 adapted to house a release rod 62 engaging the access hole 47 by means of a hooked end 64. A button 66 engages one end of the release rod 62 and is slidably disposed in one end of the handle 60.

In operation, the embodiment of the subject invention illustrated in FIGURE 1 operates as a conventional hand brake. Hand pressure on the handle 60 causes a clockwise rotation of the actuator lever 28 relative to the flanges 24 and 26 as viewed in FIGURE 1. The end of the actuator lever 28, in which is disposed the apertures 36, likewise rotates in a clockwise manner with respect to the pivotal mounting of the lever 28. The pin 34 pivotally carrying the ratchet lever 32 slides in the slot 40 to follow the clockwise moving lever 28. The teeth 56 of the ratchet lever 32 ride on the ratchet teeth 54 of the lever bracket 14. As the ball 42 attached to the cable 12 is moved relative to the slot 40, tension is put on the vehicle brakes 10. When sufficient movement is generated to overcome the conventional brake return springs and the brakes are applied, a slight release of pressure from the handle 60 will cause a locking engagement between the pawls 56 and the ratchet teeth 54. The brake is thereby locked in an actuated position.

The brake as locked in position is releasable by a slight actuating movement of the lever 60 and thumb pressure exerted on the button 66 driving the rod 62 against the ratchet lever 32. It is seen that, in this manner, the interlocked teeth 56 and 54 are disengaged by a slight actuating movement of the lever 60 and the teeth 56 are pivoted clear of the ratchet teeth 54 around the pin 34 as the rod 62 moves the ratchet lever 32. Thereafter, pressure is maintained on the button 66 and the lever 28 is drawn to a poised position, as viewed in FIGURE 1, by the return spring induced tension on the cable 12. The pin 34 will move to the end of the slot 40, as shown in FIGURE 1, and the release cycle is completed.

When the subject invention is utilized as a fly-off type hand brake, the ratchet lever 32 is reversed on its mounting to a position as shown in FIGURE 2. The modification illustrated in FIGURE 2 is identical with that shown in FIGURE 1 except for the relative positioning of the pawls 56 of the ratchet lever 32 and the ratchet teeth 54 carried by the bracket 14.

As pressure is exerted in a clockwise manner on the handle 60, the pin 34 is pivoted about the pivotal mounting of the lever 28 on the bracket 14 and slides in the slot 40. The ratchet lever 42 being uncontained at its upper end moves initially in the counterclockwise manner with respect to the pin 34 until a surface 68 of the ratchet lever 32 contacts a cam portion 70 of the lever 28. It should be noted that the pawls 56 as positioned in this embodiment tend to remain spaced from the ratchet teeth 54 of the bracket 14 as the cam portion 70 and the surface 68 come into contact. The ratchet lever 32 is thereafter pivoted in a clockwise manner around the pin 34. As actuating pressure continues, the cable 12 draws the brakes 10 to an actuated position. It should be noted that, when the brakes are applied and the lever 28 is in an actuated disposition relative to the bracket 14, the pawls 56 are not yet engaged with the ratchet teeth 54 of the bracket 14. Pressure on the button 66 will pivot the ratchet lever 32 in a clockwise manner about the pin 34 until the pawls 56 come into contact with the ratchet teeth 54. Actuating pressure on the lever 28 is then slightly released and the pawls 56 engaged the teeth 54 in a locking manner to hold the brake in the actuated position.

When it is desired to release the brake from an applied position, it is necessary only to draw the lever 28 into an actuating direction very slightly. The return springs in the vehicle brakes 10 provide enough force on the cable 12 to pivot the ratchet lever 32 in a clockwise manner about the pin 34 until the surface 68 of the ratchet lever 32 engages the cam portion 70 of the lever 28. A releasing of the pressure on the lever 28 will thereafter allow the brake to fly-off and the vehicle is immediately movable from a parked position. It is noted that button 66 need not be depressed to release the brakes and the sought after fly-off capability is realized.

The utility of the present invention is obvious in that the operative portions of the brake mechanism are interlocked by virtue of the unique construction and, in an environment where a fly-off capability is not desired, a repositioning of one component converts the subject device to a conventional hand brake.

While the embodiments of the present invention, as herein disclosed, constitute preferred forms, it is to be understood that other forms might be adopted.

What is claimed is as follows:

1. A hand brake for a motor vehicle comprising: first means carried by a fixed portion of the vehicle; second means pivotally carried by said first means and adapted tto have a manual force exerted thereon; and third means pivotally carried by the second means and engaged by a cable to vehicle brakes, said third means being cammable by the second means in response to a force from said second means during a pivotal movement thereof to energize vehicle brakes, said third means and said first means being selectively engageable to hold vehicle brakes energized.

2. A hand brake for motor vehicles having cable energizable vehicle brakes comprising: first means carried by a fixed portion of the vehicle and having complementary wall portions forming a pivot; second means being pivotally mounted on said first means and including release means; third means pivotally carried by said second means and having a portion engaging a cable arranged to mechanically energize vehicle brakes, said first means resiliently held by said second means at the pivot point of said second means, said third means being engageable with said first means as a manual force is exerted on the second means to effect a pivoting thereof, said release means carried by the second means being energizable to separate said third means from said first means to effect a release of the vehicle brakes.

3. A hand brake for motor vehicles comprising: a bracket means carried by a fixed portion of a vehicle and having complementary opposed portions adaptable to form a pivot; lever means including apertures engaged with the outwardly projecting complementary portions of the bracket to effect a pivotal mounting thereon, said second means including a cam portion and apertures in juxtaposed wall portions; third means pivotally carried by the second means and having portions engageable with said bracket means and said second means; and pin means engaging said third means and the apertures in opposed wall portions of the second means to provide a pivotal mounting for said third means, said second means being manually pivotable in a first direction to move said third means in an opposite direction initially into engagement with the cam portion of said second means during a pivotal movement in the first direction, said third means being cammable by said second means in a reverse direction causing said third means to engage with said first means to hold said second means in an actuated position, said second means including release means for disengaging said third means from said first means thereby effecting a brake release.

4. A hand brake for a vehicle having cable actuated vehicle wheel brakes, said hand brake comprising: a lever bracket carried by a fixed portion of the vehicle and including oppositely disposed outwardly extending flanges and slotted portions of arcuate form, said lever bracket being formed by parallel disposed wall portions each carrying one of said oppositely disposed outwardly extending flanges, said parallel wall portions being resilient members; an actuator lever including parallel wall portions including oppositely disposed apertures therein resiliently engaged by the oppositely disposed outwardly projecting flanges of said lever bracket to provide a pivotal mounting for said lever, said lever including a cam portion and a locking mechanism; a ratchet lever pivotally supported on said actuator lever and having a portion engageable with the cable actuated vehicle brakes, said ratchet lever including portions engageable with said lever bracket and a portion engageable with the cam portion of the actuator lever; and pin means providing a pivotal support for said ratchet lever on said actuator lever and being slidably disposed in the slotted portion of the lever bracket, said ratchet lever being pivotable in one direction on the cam portion of the actuator lever during the initial portion of a pivotal movement of the actuator lever, said ratchet lever being reversely pivotable as the brake actuating resisting force is overcome by a force on said actuator lever, said ratchet lever being engageable by the locking mechanism of the actuator lever to be drivable into engagement with said lever bracket so that a portion of the ratchet lever engages said lever bracket in a manner resisting counter-rotation of the ratchet lever, said actuator lever adapted to be moved in an actuating direction to effect a releasing of the vehicle brake.

5. A hand brake for a motor vehicle having cable energized vehicle brakes, the cable having a ball formed on one end thereof, said hand brake comprising: a lever bracket mounted on a fixed portion of the vehicle and having opposed walls carrying oppositely disposed complementary outwardly projecting flanges, said lever bracket having a slot formed therein and a portion having ratchet teeth thereon; an actuator lever having parallel disposed wall portions with oppositely disposed apertures therein biasedly engaged by the outwardly projecting flanges of the lever bracket to provide a pivoting mounting for said actuator lever on said lever bracket, said actuator lever including a rod passing through a portion of said actuator lever and manually slidable therein; pin means including a slotted portion adapted to accommodate the ball end of the cable to the vehicle brakes, said pin means being pivotally supported by said actuator lever and slidable in the slot in said lever bracket; and a ratchet lever pivotally carried by said pin means and including a ball socket for carrying the ball end of the cable, said ball socket being juxtaposed to the slotted portion of the pin means, said ratchet lever being pivotable in one direction with respect to the ratchet teeth of the lever bracket in response to a pivotal movement of said actuator lever to engage the vehicle brakes, said ratchet lever being slidable over the ratchet teeth of said lever bracket during a brake actuation as the brake energizing resisting force is overcome by an actuating force on the actuator lever, said ratchet lever being engageable with the ratchet teeth on the lever bracket to maintain the vehicle brakes in an actuated condition by a slight release of actuating pressure, said ratchet lever being movable by the rod carried in the actuator lever to drive said ratchet lever out of engagement with said lever bracket and combined with a slight increase in actuation pressure to release the vehicle brakes.

6. The hand brake according to claim 5 wherein the ratchet lever is reversely positionable on the pin means to effect an opposite disposition with respect to the ratchet teeth on the lever bracket to give said hand brake a fly-off release capability.

7. A hand brake according to claim 5 wherein the ratchet lever has ratchet teeth positionable on either side of ratchet teeth peripherally disposed on a portion of the lever bracket to provide said hand brake with a release capability brought about by a movement of the rod disposed in the actuator lever and the capability when reversely positioned for a fly-off release in response to an overactuating movement of the actuating lever.

References Cited by the Examiner

UNITED STATES PATENTS

| | | | |
|---|---|---|---|
| 2,112,607 | 3/1938 | Pooley | 74—516 |
| 3,217,558 | 11/1965 | Schroter | 74—535 X |

MILTON KAUFMAN, *Primary Examiner*.